UNITED STATES PATENT OFFICE.

HENRY STAIER, OF NEW YORK, N. Y.

PROCESS OF MAKING A COMPOSITION FOR USE IN MATCHES.

1,092,408. Specification of Letters Patent. Patented Apr. 7, 1914.

No Drawing. Application filed November 16, 1910, Serial No. 592,597. Renewed September 19, 1913. Serial No. 790,781.

*To all whom it may concern:*

Be it known that I, HENRY STAIER, a subject of the Emperor of Germany, having announced my intention of becoming a citizen of the United States of America, and residing at New York, county and State of New York, have invented certain new and useful Improvements in Processes of Making a Composition for Use in Matches, of which the following is a specification.

The main object of my invention is to provide an efficient substitute for yellow phosphorus in the manufacture of match-head compositions, such as will be non-poisonous both in the process of its production, and in its employment as an ingredient in the final match-head compound.

Further objects of my invention are to produce a material such as is stable and will not deteriorate, and which in its employment as an ingredient of the final compound, will cause the latter to ignite under friction at a low temperature, and to be substantially non-explosive.

To the foregoing ends I employ one of the metallic sulfids in combination with red phosphorus and sulfur. The sulfid employed may be iron, zinc, copper, antimony, or other sulfid, as may be desired; and the proportions of the materials may be varied considerably. So far I have found that the following proportions (by weight) give good results, to wit: 2 parts metallic sulfid, 6 parts red phosphorus, 3 parts sulfur.

In carrying out the process, I thoroughly mix the three ingredients together and heat them to a temperature of about 500 degrees Fahrenheit in a closed vessel. I then wash the mixture thoroughly with hot, preferably boiling, water, then draw off the surplus water and dry the remainder, the product resulting being a dark gray powder. I then employ this product as a match-head compound ingredient in place of the yellow phosphorus commonly employed, mixing it with one or more inert friction and binding elements such as powdered glass, whiting, and glue, or other ingredients such as are commonly employed in the production of such compounds, and the final compound may be applied to splints or stems in the usual or any desired manner.

The foregoing composition is what is known in the match trade as non-poisonous, that is to say, it is not poisonous to the workmen who are handling it or who are subjected to its fumes. Furthermore the metallic sulfid red phosphorus and sulfur compound, is stable and will not deteriorate, even if kept for a considerable time before being employed as an ingredient of the final compound. The final compound will ignite readily under friction, the required temperature being around 150 degrees Fahrenheit, and ignition takes place quietly and non-explosively.

What I claim is:

1. The herein described process of producing a substitute for yellow phosphorus in the manufacture of match compositions which comprises thoroughly mixing red phosphorus, metallic sulfid, and sulfur and heating the mixture to a temperature of about 500 degrees Fahrenheit.

2. The herein described process of producing a substitute for yellow phosphorus in the manufacture of match compositions which consists in thoroughly mixing red phosphorus, metallic sulfid, and sulfur and heating the mixture to a temperature of about 500 degrees Fahrenheit, then washing the mixture with water at a high temperature. and then removing the surplus water and drying the product.

3. The herein described process of producing a substitute for yellow phosphorus in the manufacture of match compositions which comprises thoroughly mixing red phosphorus, metallic sulfid and sulfur in the proportion by weight of six parts of red phosphorus, two parts of metallic sulfid, and three parts of sulfur, and heating the mixture to a temperature of about 500 degrees Fahrenheit.

4. The herein described process of producing a substitute for yellow phosphorus in the manufacture of match compositions which comprises mixing red phosphorus, metallic sulfid, and sulfur in the proportion by weight of six parts of red phosphorus, two parts of metallic sulfid and three parts of sulfur, heating the mixture to a temperature of about 500 degrees Fahrenheit, then washing the mixture with water at a high temperature and then removing the surplus water and drying the mixture.

HENRY STAIER.

Witnesses:
D. HOWARD HAYWOOD,
LYMAN S. ANDREWS, Jr.